United States Patent [19]

Shingu et al.

[11] Patent Number: 5,638,229
[45] Date of Patent: Jun. 10, 1997

[54] METHOD FOR DETECTING AN INFORMATION RECORDED POSITION IN AN INFORMATION REPRODUCING APPARATUS

[75] Inventors: Toshiaki Shingu, Kawasaki; Tsunenori Yoshinari, Tokyo; Hideyuki Nishida, Yokohama; Katsumi Arisaka, Kawasaki, all of Japan

[73] Assignee: Canon Kabushiki Kaisha, Tokyo, Japan

[21] Appl. No.: 380,320

[22] Filed: Jan. 30, 1995

Related U.S. Application Data

[63] Continuation of Ser. No. 980,966, Nov. 24, 1992, abandoned.

[30] Foreign Application Priority Data

Nov. 29, 1991 [JP] Japan ................................ 3-340300

[51] Int. Cl.$^6$ ............................................. G11B 15/22
[52] U.S. Cl. ........................ 360/72.3; 360/72.2; 360/74.1; 360/74.2; 360/74.4; 360/75
[58] Field of Search ........................... 360/72.1, 72.3, 360/72.2, 74.1, 74.2, 74.4, 75, 71

[56] References Cited

U.S. PATENT DOCUMENTS

| 4,210,940 | 7/1980 | Prysby et al. | 360/72.3 |
|---|---|---|---|
| 4,855,977 | 8/1989 | Getreuer et al. | 369/32 |
| 4,890,171 | 12/1989 | Nagao | 360/73.05 |
| 5,179,479 | 1/1993 | Ahn | 360/72.1 |

*Primary Examiner*—A. Psitos
*Assistant Examiner*—James T. Wilson
*Attorney, Agent, or Firm*—Fitzpatrick, Cella, Harper & Scinto

[57] ABSTRACT

A method for setting an information reader to a target information recorded position on an information recording medium in an information reproducing apparatus includes steps of reading a start position from the medium by the reader, which contacts the medium, separating the reader from the medium after reading the current position, driving the medium after separating the reader from the medium, successively estimating a current read position based on the start position and a driving motion during the driving step, checking whether the estimated current read position matches a target position, contacting the reader with the medium and reading position information when the estimated current read position matches the target position, comparing the position represented by the read position information with the target position and driving the medium, contacting the reader, while reading the position information when a mismatch is detected, and comparing the position represented by the newly read position information with the target position and continuing to drive the medium until a match is detected by the comparison.

3 Claims, 4 Drawing Sheets

FIG. 2

| TOC | AREA A | AREA B | AREA C | AREA D | AREA E |
|---|---|---|---|---|---|
| 1 | 800 801 | 1400 1401 | 1600 1601 | 1800 1801 | 2000 |

FIG. 3

| MINUTES | 1~800 |
| MATERIALS | 801~1400 |
| CATALOG | 1401~1600 |
| MEMOS | 1601~1800 |
| OTHERS | 1801~2000 |

METHOD FOR DETECTING AN INFORMATION RECORDED POSITION IN AN INFORMATION REPRODUCING APPARATUS

This application is a continuation of application Ser. No. 07/980,966 filed Nov. 24, 1992, now abandoned.

BACKGROUND OF THE INVENTION

1. Field of the Invention

The present invention relates to a method for searching a position on a recording medium, at which desired information has been recorded, in order to read the desired information in an apparatus for reproducing information recorded on the recording medium, such as a magnetic tape.

2. Related Background Art

A conventional tape recorder has a function to sequentially determine a current position of a tape under drive based on a frequency generator (FG) pulse generated by the rotation of a drive motor and stop the rotation or resume the reproduction when the current postion reaches a desired position.

However, in the prior art function, precision of the position determined is not so high. As an alternative method, a sub-code for indicating an information position is stored on the magnetic tape which records information thereon and the sub-code is searched to precisely determine the recorded position of the desired information so that the information may be read from the determined position.

However, in an apparatus which frequently needs to access a random position such as an electronic file unit using a digital audio tape recorder (DAT), a search time is long and the number of times of searching is high. In the search by the sub-code, since it is necessary to drive the tape at a high speed while the head contacts the tape, both the head and the tape are rapidly worn as the search is repeated.

SUMMARY OF THE INVENTION

It is an object of the present invention to provide a method for detecting an information recorded position, which assures little damage to a recording medium and a reproducing apparatus and a high speed operation with a high precision.

It is another object of the present invention to provide a method for detecting an information recorded position which assures a high precision and requires a smaller contact search time to a recording medium.

According to one aspect, the present invention which achieves these objectives relates to an information reproducing apparatus for altering an information read position on an information recording medium by moving the information recording medium relative to an information reader to read information containing position information recorded at the position by the information reader, comprising: drive means for driving the information recording medium relative to the information reader; measurement means for measuring a distance of drive by the drive means from a start time, infer means for inferring a current read position based on the distance of drive measured by the measurement means; check means for determining whether the current read position inferred by the infer means matches to a target position; first control means for controlling the information reader to read the position information from the current read position when the match is detected by the check means; compare means for comparing the position represented by the position information read by the information reader with the target position; second control means for comparing the position represented by the position information read under the control of the first control means with the target position by the compare means; and third control means for continuing the drive by the drive means until the compare means detects the matching between the position represented by the position information newly read by the information reader and the target position when the comparison by the compare means under the control of the second control means indicates a mismatching.

According to another aspect, the present invention which achieves these objectives relates to a method for detecting a target information record position on an information recording medium in an information reproducing apparatus, comprising the steps of: driving the information recording medium relative to an information reader; measuring a distance of drive by the drive from a start time; inferring a current read position based on the measured distance of drive; checking whether the inferred current read position matches a target position; reading position information from the current read position when the matching is detected by the check; comparing the position represented by the read position information with the target position; driving the information recording medium while reading the position information when mismatch is detected by the comparison, comparing the position represented by the newly read position information with the target position and continuing to drive the information recording medium until the matching is detected by the comparison.

Other objectives and advantages besides those discussed above shall be apparent to those skilled in the art from the description of a preferred embodiment of the invention which follows. In the description, reference is made to the accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 shows a record format of a magnetic tape, FIG. 3 shows a table of contents (TOC)

DESCRIPTION OF THE PREFERRED EMBODIMENTS

One embodiment of the present invention is now explained with reference to the drawings.

Figure 1:
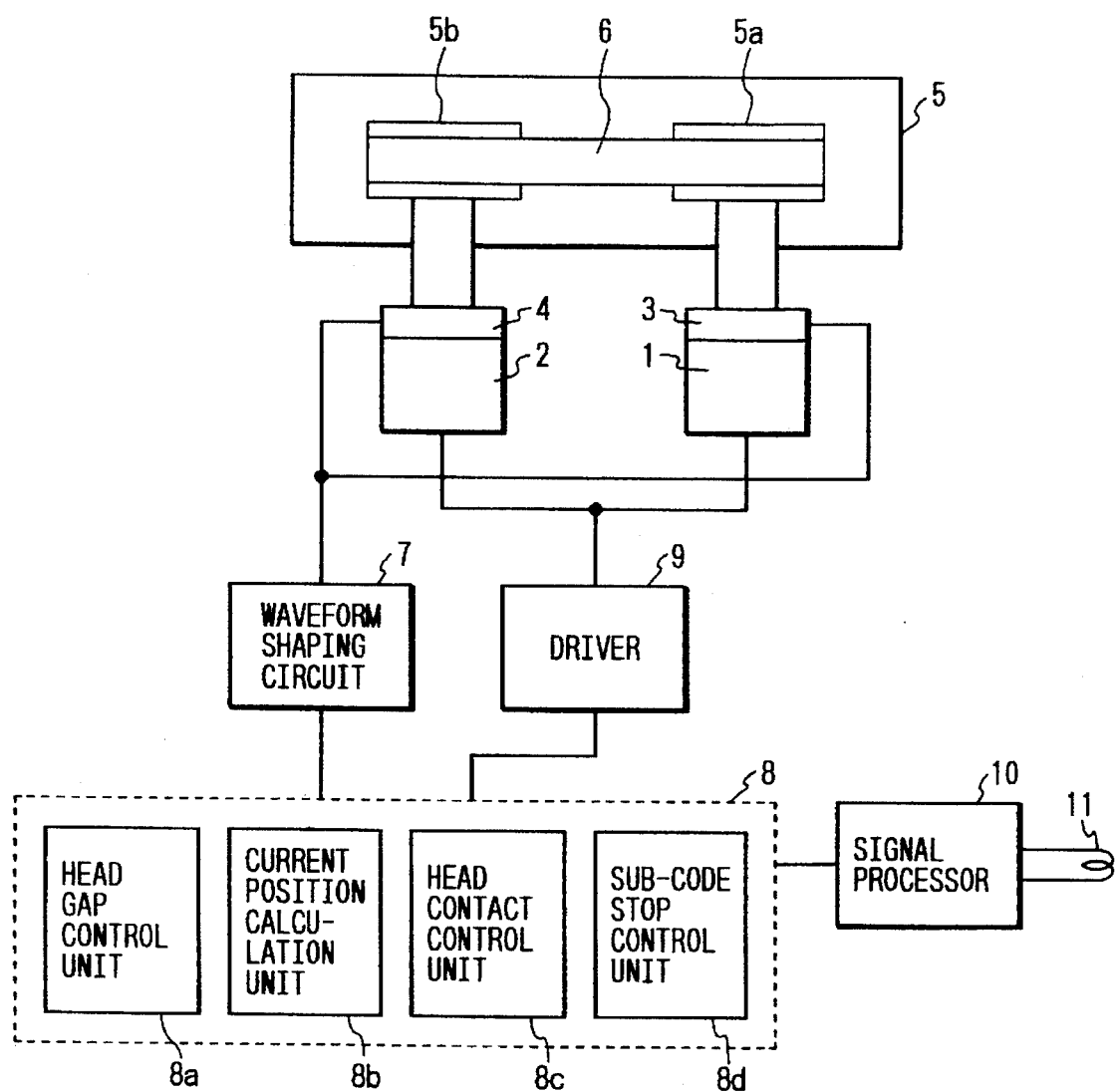
FIG. 1 shows a block diagram of one embodiment of a magnetic recording and reproducing apparatus.

FIG. 1 is a block diagram showing a schematic constitution of a magnetic recording and reproducing apparatus according to an embodiment of the present invention.

A magnetic recording and reproducing apparatus of the present embodiment has drive motors 1 and 2 for driving a magnetic tape, and frequency generator (FG) pulse detectors 3 and 4 are provided around rotating shafts of the drive motors 1 and 2, respectively. Each of the FG pulse detectors 3 and 4 has a magnet and a pickup coil, and an FG pulse of 180–240 Hz is taken out by the combination of the magnet and the pickup coil when the drive motor 1 or 2 is rotated. The rotating shafts of the drive motors 1 and 2 are mounted to reels 5a and 5b of a tape cassette 5, respectively. A magnetic tape 6 is wound on the reels 5a and 5b.

On the other hand, outputs of the FG pulse detectors 3 and 4 are connected to a waveform shaping circuit 7 which shapes waveforms of the FG pulses and converts them to a DC voltage, and an output of the waveform shaping circuit 7 is connected to a system controller 8 which controls an operation of the entire apparatus. The system controller 8 comprises a head gap control unit 8a, a current position calculation unit 8b, a head contact control unit 8c and a sub-code stop control unit 8d. It also temporarily stores information and performs comparison and arithmetic and logical operations.

The drive motors 1 and 2 are connected to the system controller 8 through a driver 9, and a magnetic head 11 is connected through a signal processor 10, which processes signals, for example, digitizing the signal from the magnetic head 11 which is mounted on a rotating drum, not shown, and contacts the magnetic tape 6 to read information.

FIG. 2 shows a record format of the magnetic tape 6.

As shown in FIG. 2, a table of contents (TOC) is recorded at a head position of the magnetic tape 6, a data area A is recorded at succeeding addresses 1–800, a data area B is recorded at addresses 801–1400, a data area C is recorded at addresses 1401–1600, a data area D is recorded at addresses 1601–1800, and a data area E is recorded at addresses 1801–2000, sequentially.

A content of the table of contents (TOC) is shown in FIG. 3.

As shown in FIG. 3, identification information representing the contents (minutes, materials, catalog, memos and others) are recorded as the table of contents and address ranges thereof are recorded, in the areas A–E of the TOC.

Figure 4:
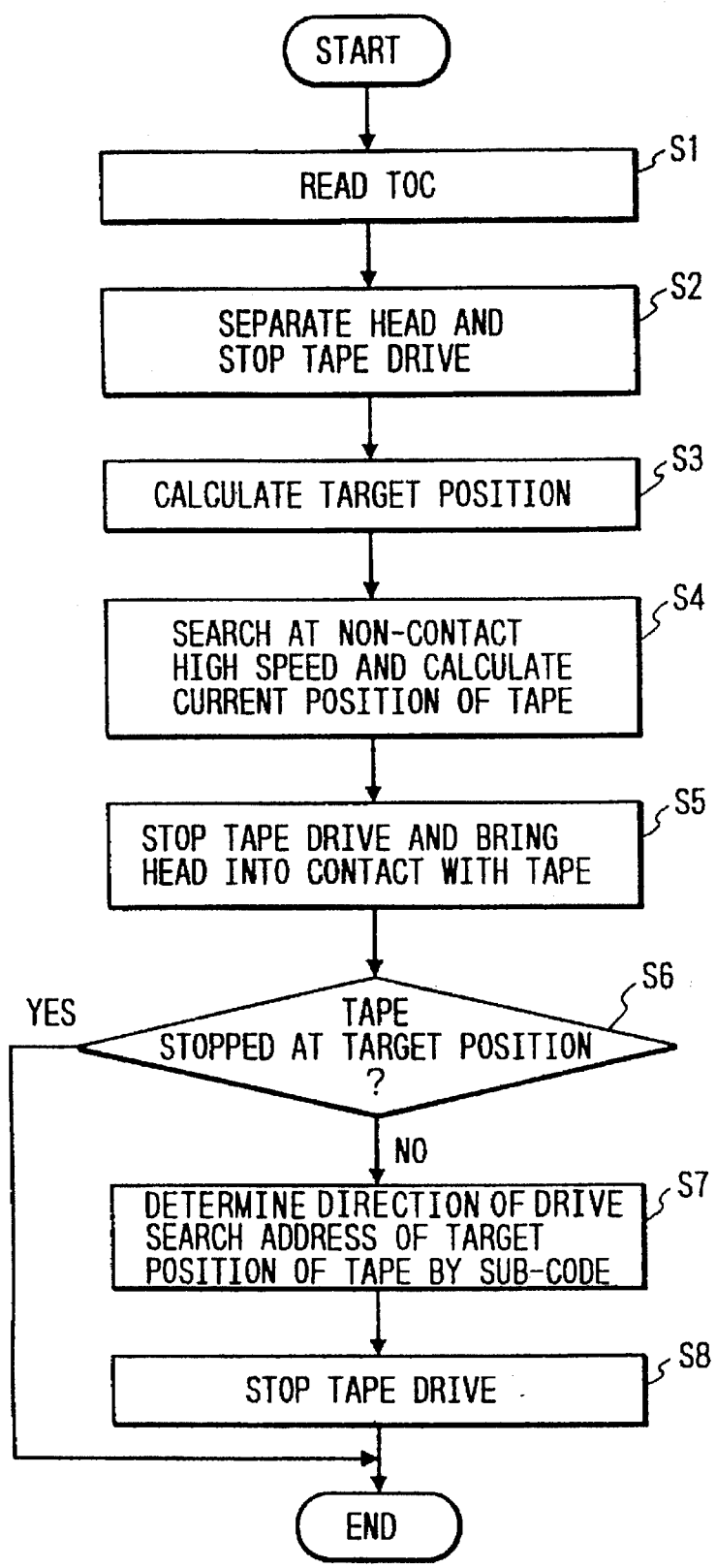
FIG. 4 shows a flow chart of an information retrieval operation.

An information retrieval operation in the magnetic recording and reproducing apparatus described above is now explained with reference to FIG. 4, Which shows a flow chart of the information retrieval operation of the present embodiment. The system controller 8 stores a control program corresponding to the flow chart in a control memory, not shown, and executes the program to perform the retrieval operation.

First, an operator specifies through a keyboard, not shown, a target position on the magnetic tape 6 having information to be retieved recorded thereon, for example, an address 1000 of the area B of FIG. 2, and depresses a retrieval start key to supply a search command to the system controller 8 and loads the magnetic tape 6. Then, the system controller 8 causes the magnetic head 11 to contact the magnetic tape 6. The TOC is read from the magnetic tape 6 (step S1), and the magnetic head 11 is spaced from the magnetic tape 6 by the head gap control unit 8a, and the magnetic tape 6 is stopped.

The system controller 8 calculates the tape position of the target position based on the address indicated by the TOC (step S3). It is a calculation process to determine in a percentage value the address 1000 of the target position on the magnetic tape 6. In the present example, the target position corresponds to a 50% position of the magnetic tape 6. After the tape position of the target position has been calculated, the driver 9 is controlled to drive the drive motors 1 and 2. The FG pulse detectors 3 and 4 detect the FG pulses generated by the rotation of the drive motors 1 and 2 and send the FG pulses to the waveform shaping circuit 7.

The waveform shaping circuit 7 shapes and converts the FG pulses to a DC voltage and sends it to the system controller 8, which controls the driver 9 in response to the output from the waveform shaping circuit 7 to keep the rotation of the drive motors 1 and 2 at a constant level. Simultaneously, the current position calculation unit 8b of the system controller 8 sequentially calculates the percent value of the current position of the magnetic tape 6 under drive based on the output from the waveform shaping circuit 7 (step S4).

When the current position of the magnetic tape 6 calculated by the current position calculation unit 8b reaches 50% to coincide with the target position, the head contact control unit 8c stops the drive of the magnetic tape 6 and causes the magnetic head 11 to contact to the magnetic tape 6 (step S5).

When the current position of the magnetic tape 6 is calculated based on the FG pulses, there may occur an error in the calculation and hence an error between a stop position of the magnetic tape 6 and the target position. For example, the tape may be stopped at a 45% position while it is to be stopped at the 50% position. In the present embodiment, the sub-code stop control unit 8d is provided to correct the error.

The sub-code stop control unit 8d reads the sub-code of the current position from the magnetic tape 6, and if there is an error from the sub-code corresponding to the target position (step S6), drives the magnetic tape 6 while the magnetic head 11 is contacted thereto to sequentially read the sub-codes on the magnetic tape 6. During the drive, the direction of the drive from the current position to the target position is determined by the comparison of the sub-codes. Namely, when the current position address is ahead of the target position address, the direction of drive is reversed. When the sub-code representing the address 1000 which is the target position is reached (step S7), the magnetic tape 6 is stopped (step S8).

In this manner, the magnetic tape 6 is queued and the information at the address 1000 which is the target address is read through the magnetic head 11. The read information is sent to the system controller 8 through the signal processor 10 where the signal is reproduced and outputted to a CRT or a speaker.

In the present embodiment, the tape position of the target position is calculated based on the address indicated by the TOC. When the target position entered by the operator is related to the tape position, the process of reading the TOC to calculate the tape position of the target position may be omitted.

In the present embodiment, the search is started from the head position. Alternatively, the TOC read during the first search may be stored and the search may be started from the current position in the second and subsequent searches. In this case, the current position may be derived from the sub-code, a required drive distance may be determined based on the current position and the target position, and the search by the FG pulses and the search by the sub-code may be effected as they are in the present embodiment. When the current position is continuously derived during the reproduction, it is not necessary to confirm the current position prior to the search.

Figure 5:
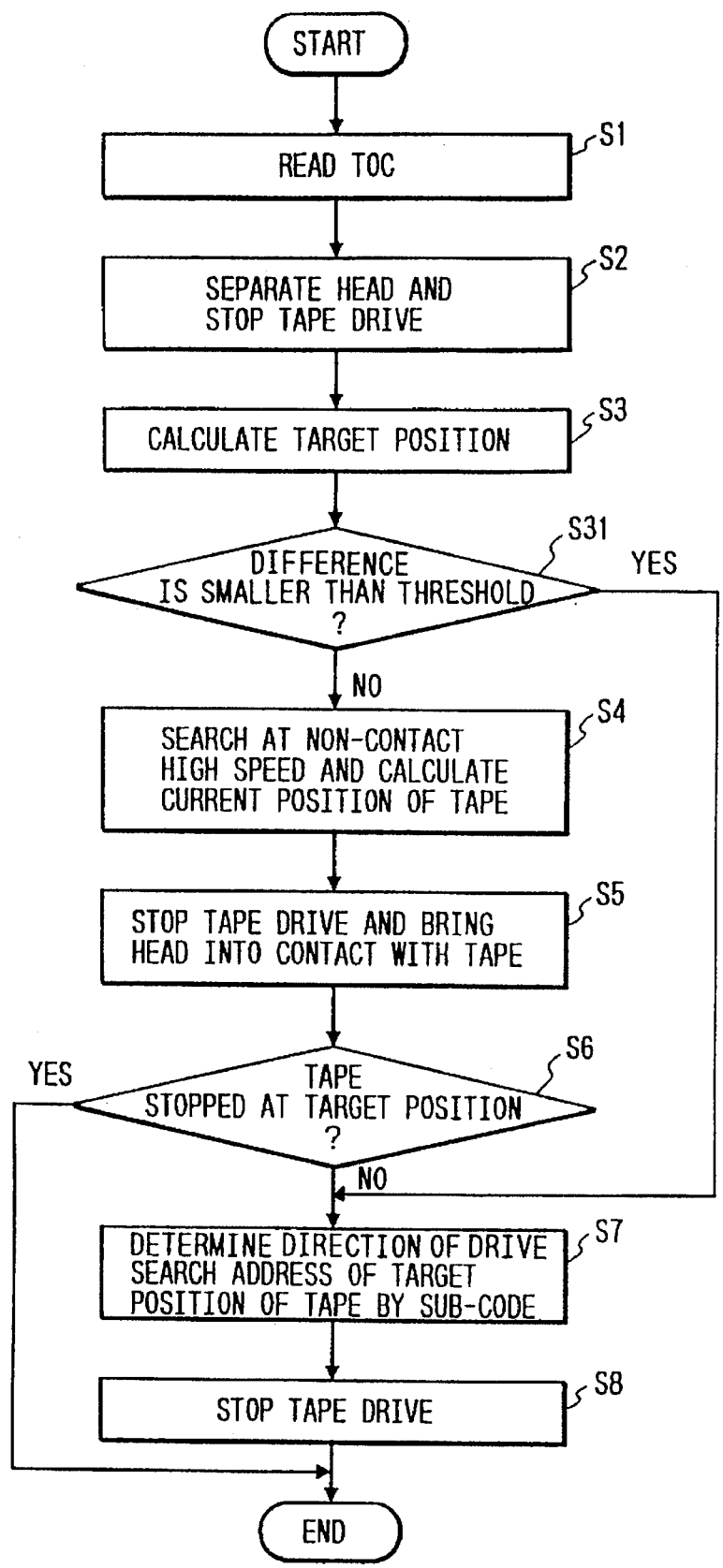
FIG. 5 shows a flow chart of an information retrieval operation in another embodiment.

In the present embodiment, the search by the FG pulses is conducted and then the search by the sub-code is conducted. When the tape drive distance is short, the process may be faster by first searching by the sub-code and the wear by the contact may be less. Thus, an appropriate threshold for the address or sub-code may be set, and the flow chart shown in FIG. 4 may be modified as shown in FIG. 5 where if the difference between the current position and the target position is smaller than the threshold at step S31, the search by the FG pulses (steps 4 through 6) may be omitted and the search by the sub-code (steps 7 and 8) is conducted. In this manner, the process may be branched depending on the distance to the target position.

In the present embodiment, the user enters the address to specify the target position. Alternatively, a menu having identification of areas arranged may be prepared from the TOC, and a head position of the area corresponding to a selected menu item may be used as the target position. Alternatively, the areas may be designated by the order of appearance.

In the present embodiment, the apparatus uses the magnetic tape as the medium, although other recording formats or other media may be used. The present invention is applicable to any reproducing apparatus which has two functions, the function for inferring the current position based on the driven distance of the recording medium and the function of determining the current position by reading the position information from the recording medium. It is also applicable to an apparatus in which the recording medium is not driven but a read unit is driven.

Although the present invention has been described in its preferred form with a certain degree of particularly, many apparently widely different embodiments of the invention can be made without departing from the spirit and the scope thereof. It is to be understood that the invention is not limited to the specific embodiments thereof except as defined in the appended claims.

What is claimed is:

1. A method for setting a head to a target position on a tape in a tape recorder, in which position codes indicating positions are recorded in respective positions on the tape, said method comprising:

a first reading step for contacting the head with a drive start position on the tape and reading out a position code in the drive start position on the tape by the head;

a separating step for separating the head from the tape after reading out the position code in the drive start position;

a first driving step for driving the tape after separating the head from the tape;

an estimating step for successively estimating a current position based on the drive start position and a driving amount during said first driving step;

a first checking step for checking whether the successively estimated current position matches a target position;

a stopping step for stopping the drive of the tape when the estimated current position matches the target position, as determined in said first checking step;

a second reading step for contacting the head with the position on the tape at which the tape stopped in said stopping step and reading out a position code in the stopped position on the tape by the head after the drive of the tape is stopped;

a judging step for judging whether a real current position represented by the position code read out in said second reading step is equal to, ahead of, or behind the target position;

a determining step for determining that a change of the real current position is unnecessary when the real current position is equal to the target position and determining that a change is necessary and that a direction of the drive required to make the change is forward or backward when the real current position is ahead of or behind the target position, respectively, as judged in said judging step;

a second driving step for driving the tape in the direction determined in said determining step while contacting the head with the tape for changing the real current position, said second driving step being performed when a change is determined to be necessary in said determining step;

a second checking step for successively reading out position codes on the tape by the head and checking whether the read current position represented by the position code successively read out matches the target position during said second driving step; and a control step for continuing to drive the tape in said second driving step until a match is detected in said second checking step.

2. A method according to claim 1, further comprising:

a determining step for determining whether a difference from the drive start position to the target position is less than a predetermined threshold;

a third driving step for driving the tape from the drive start position to the target position while the tape contacts the head when the difference is less than the predetermined threshold;

a third checking step for successively reading out position codes on the tape by the head and checking whether the position represented by the position code successively read out matches the target position; and a second control step for continuing to drive the tape in said third driving step until a match is detected in said third checking step.

3. A method according to claim 1, wherein the driving steps are executed using a motor and the estimating step is performed based on a frequency generator pulse detected from the motor.

* * * * *